Patented Nov. 24, 1925.

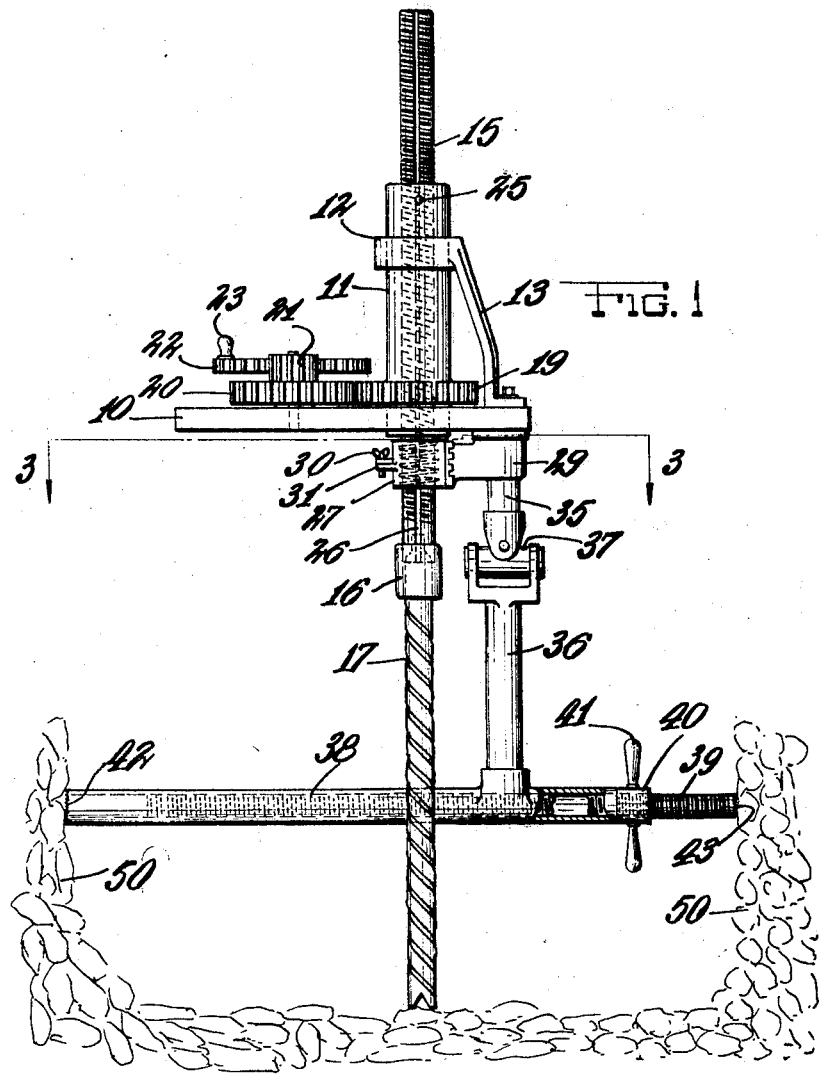

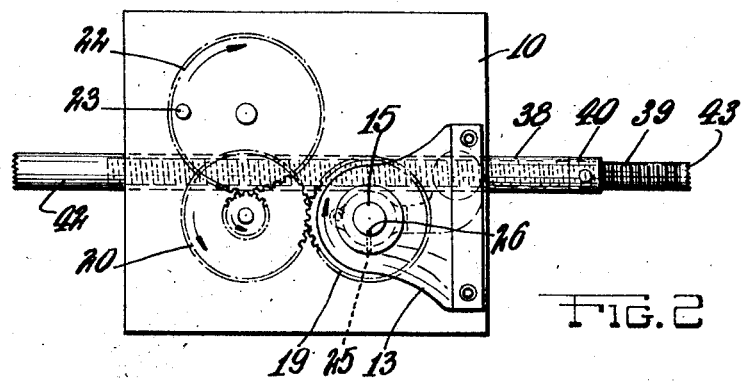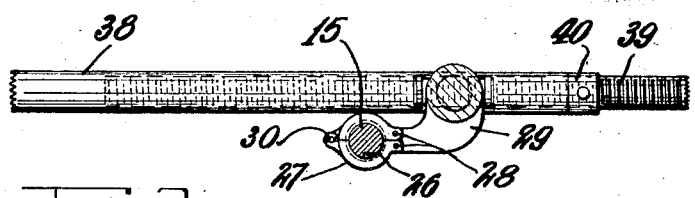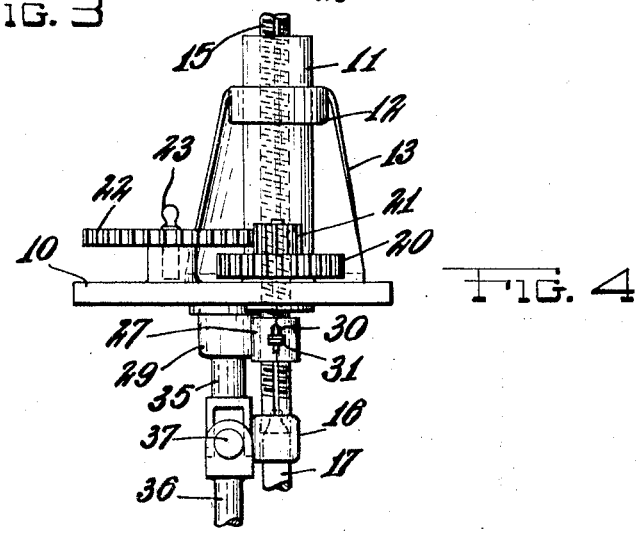

1,562,864

UNITED STATES PATENT OFFICE.

FRANK BROSOSKY, OF HAYWOOD, WEST VIRGINIA.

MINING DRILL.

Application filed December 10, 1921. Serial No. 521,290.

*To all whom it may concern:*

Be it known that I, FRANK BROSOSKY, citizen of Russia, residing at Haywood, in the county of Harrison and State of West Virginia, have invented certain new and useful Improvements in Mining Drills, of which the following is a specification.

This invention relates to drills, being intended more particularly for embodiment in drills used in mining coal, or the like.

The invention has for an object to provide a novel and efficient drill of this type, and further to provide a drill having an anchoring means which permits of adjustment of the drill to different angles with respect to the anchoring device.

For further comprehension of the invention and of the objects and advantages thereof, reference will be had to the following description and accompanying drawings, and to the appended claims in which the various novel features of the invention are more particularly set forth.

Fig. 1 of the drawings is a side view of a drill constructed according to the invention.

Fig. 2 is a plan view thereof.

Fig. 3 is a horizontal section taken on the line 3—3 of Fig. 1.

Fig. 4 is a fragmentary vertical elevation at right angles to Fig. 1.

In constructing my improved drill I provide a horizontal frame-plate 10 of rectangular shape which serves as a guide for the drill and as a support for the operating mechanism. Rotatably mounted on this plate is a vertical sleeve 11 which projects at its lower end through a suitable bearing aperture in the plate, the upper end of the sleeve being braced by an encircling ring 12 formed on the upper end of a bracket 13 fixed to the plate.

Extending freely through the sleeve 11 is a screw 15 which has a chuck 16 of ordinary construction fixed on its lower end, this chuck being adapted to hold the drilling bit 17, which may be of any usual or approved construction.

Rotation of the screw 15 acts to both rotate the bit 17 and feed it forward, the following means to this end being provided: The sleeve 11 has fixed co-axially thereto a gear 19 which meshes with a gear 20 suitably journaled on the plate 10, this latter gear having fixed thereto a pinion 21 engaged by another gear 22 suitably journaled on plate 10. This latter gear 22 has a crank knob 23 fixed thereon for purposes of rotation. Sleeve 11 has a feather connection with the screw 15 whereby the screw is caused to rotate with the sleeve while moving axially therein. This feather connection is formed by a pin 25 fixed in the sleeve and projecting into a longitudinal groove 26 in the screw.

To impart axial movement to the screw 15 the latter is engaged by a split nut 27 the two halves whereof are hinged as at 28 to a bracket 29 fixed to the underside of the plate 10 and are held in engagement with the screw by means of a thumb screw 30 passing through lugs 31 formed on the nut halves.

The frame plate 10 is provided with an attachment adapted to be engaged with convenient fixed parts, such as the walls of the seam being drilled, to hold it against backward movement as the screw is fed forward. This attachment comprises a rod depending from the plate 10 and divided into upper and lower sections 35 and 36 united by a universal joint 37. This rod has fixed to its lower end a horizontal tube 38 in which is freely engaged a screw 39. This screw has a nut 40 threaded thereon, the nut being provided with handles 41 for rotation. The opposed end of the tube 38 and screw 39 may be roughened or serrated as indicated at 42 and 43 to enable them to firmly grip the walls of the seam.

In the operation of my improved drill the expanding clamp formed by the tube 38 and screw 39 is placed between suitable parts such as the walls of the seam indicated at 50, and nut 40 is threaded inwardly along the screw, the engagement of the nut with the end of the tube 38 acting to force the serrated ends of tube and sleeve into firm gripping action. The drilling bit 17 is then directed as desired on the work to be drilled, the universal joint 37 permitting variation of the direction or angle of the drill, as will be apparent. Knob 23 is then rotated by hand, causing sleeve 11 and screw 15 to be rotated. The engagement of screw 15 with the split nut 27 causes the screw, and with it the drilling bit 17, to be fed forward. When the drill is to be withdrawn, the thumbscrew 30 is unscrewed and the two halves of the nut 27 swung free of the screw 15, which may then be lifted, carrying with it the drilling bit. The nut 27 is then reengaged on the lower part of the screw.

Having thus described my invention what I claim as new and desire to protect by Letters Patent of the United States is as follows:

1. A drill comprising a supporting plate, an upright bearing member secured to the upper face of said plate, a sleeve rotatably mounted in said bearing member and said plate, a gear fixed to said sleeve adjacent the upper surface of said plate, manually operable gear means journaled in the plate and operatively connected to said first named gear, a slotted screw extending axially through said sleeve, a key fixed in said sleeve and projecting into the slot in said screw, a rod fixed to the lower face of said plate, a bracket secured to said rod, a split nut on the end of said bracket and operatively engaging said screw, a drill chuck on the lower end of said screw, a second rod below said first rod, a universal connection between said rods, a laterally extending tubular member secured to the lower end of said second rod, and an extensible abutment member mounted in one end of said tubular member.

2. A drill comprising a support, an upright sleeve rotatably mounted in said support, bearing means secured to said support for rotatably supporting the upper portion of said sleeve, a gear fixed to said sleeve between the support and bearing means, means carried by said support for rotating said gear, a depending standard secured at its upper end to said support and provided with a universal connection intermediate its ends, a laterally extending tubular member secured to the lower end of said standard, an adjustable rod threaded in one end of said member, means for manually rotating said rod, a screw extending through said sleeve and having a longitudinal keyway, a key fixed to the sleeve and operatively engaging the keyway, a split nut on said screw below said support, a bracket carrying said nut and fixed to said standard above said universal connection, and a drill chuck on the lower end of said screw.

In testimony whereof I have affixed my signature.

FRANK BROSOSKY.